United States Patent
Kheil et al.

(10) Patent No.: US 9,873,363 B2
(45) Date of Patent: Jan. 23, 2018

(54) SECURING SEAT TRIM COVERS TO FOAM CUSHIONS

(71) Applicant: Velcro BVBA, Deinze (BE)

(72) Inventors: Victor Horst Kheil, Kitchener (CA); Paul Joseph Voigt, Waterdown (CA); Michael Cina, Toronto (CA); Daniel Lee Janzen, Brampton (CA)

(73) Assignee: Velcro BVBA (BE)

( * ) Notice: Subject to any disclaimer, the term of this patent is extended or adjusted under 35 U.S.C. 154(b) by 109 days.

(21) Appl. No.: 14/696,730

(22) Filed: Apr. 27, 2015

(65) Prior Publication Data

US 2016/0311352 A1    Oct. 27, 2016

(51) Int. Cl.
*B60N 2/58*  (2006.01)

(52) U.S. Cl.
CPC .................. *B60N 2/5825* (2013.01)

(58) Field of Classification Search
CPC ....... B25B 27/20; B25B 31/00; B60N 2/5833; B60N 2/5841
See application file for complete search history.

(56) References Cited

U.S. PATENT DOCUMENTS

| | | | |
|---|---|---|---|
| 1,968,168 A * | 7/1934 | Place ................. | B60R 13/0206 16/4 |
| 3,649,974 A * | 3/1972 | Baruth ................. | A47C 7/18 297/452.59 |
| 4,486,985 A * | 12/1984 | Kagitani .................. | B60J 10/30 24/292 |
| 5,353,475 A * | 10/1994 | Fischbach ............... | A47J 45/07 16/DIG. 24 |
| 5,448,804 A * | 9/1995 | Warren ............... | B60R 13/0206 24/289 |
| 5,605,373 A | 2/1997 | Wildern et al. | |
| 5,826,312 A * | 10/1998 | Schroder ............. | B60N 2/5825 24/458 |
| 6,048,025 A | 4/2000 | Tillner | |

(Continued)

FOREIGN PATENT DOCUMENTS

DE    29917372    1/2000
DE    102014011341 A1    2/2015

(Continued)

OTHER PUBLICATIONS

International Search Report and Written Opinion for PCT/EP2014/073743 dated Jan. 27, 2015 (10 pp.).

(Continued)

*Primary Examiner* — Charles A Fox
*Assistant Examiner* — Christopher E Veraa
(74) *Attorney, Agent, or Firm* — Fish & Richardson P.C.

(57) ABSTRACT

A seat trim cover includes a flexible web and a plurality of molded clips spaced-apart at predetermined intervals along a distal edge of the web. Each of the clips includes a base attached to the web and an opposing pair of latch elements extending from the clip base. Each clip also defines a tool retention feature, such as an elongated slot. The clips are designed to be forced into engagement with a retainer of a seat cushion by engaging the tool retention feature of the clip with a tool, and applying force to the engaged tool to force the clip into engagement with the retainer.

31 Claims, 9 Drawing Sheets

(56) References Cited

U.S. PATENT DOCUMENTS

| | | | |
|---|---|---|---|
| 6,122,806 A * | 9/2000 | Umezawa | B60N 2/5825 24/546 |
| 6,360,406 B1 * | 3/2002 | Patterson | H01R 13/6275 24/453 |
| 6,976,737 B1 | 12/2005 | Dandolo | |
| 7,487,575 B2 * | 2/2009 | Smith | B60N 2/5825 24/297 |
| 7,552,516 B2 | 6/2009 | Okada et al. | |
| 7,815,992 B2 | 10/2010 | Pedde et al. | |
| 7,901,002 B2 | 3/2011 | Mashimo | |
| 2002/0101109 A1 | 8/2002 | Stiller et al. | |
| 2003/0162008 A1 | 8/2003 | Capucci et al. | |
| 2011/0080032 A1 | 4/2011 | Hofmann | |
| 2011/0131777 A1 * | 6/2011 | Nanjo | B25B 31/00 29/243.56 |
| 2012/0240364 A1 * | 9/2012 | Voigt | B60N 2/5825 24/449 |
| 2014/0352117 A1 * | 12/2014 | Murasaki | A47C 31/023 24/581.11 |
| 2015/0033516 A1 * | 2/2015 | Saiga | B60N 2/5825 24/594.1 |

FOREIGN PATENT DOCUMENTS

| | | |
|---|---|---|
| FR | 2385966 A1 | 10/1978 |
| WO | WO2005/108842 | 11/2005 |
| WO | WO2009/103417 | 8/2009 |
| WO | WO2011/058415 | 5/2011 |

OTHER PUBLICATIONS

U.S. Appl. No. 14/525,606, filed Oct. 28, 2014, Kheil et al.
International Search Report and Written Option of the International Searching Authority for International Application No. PCT/EP2016/059372 dated Jul. 27, 2016 (13 pp).

* cited by examiner

SECURING SEAT TRIM COVERS TO FOAM CUSHIONS

TECHNICAL FIELD

This specification generally relates to securing seat trim covers to foam cushions.

BACKGROUND

Seats for cars and light trucks have been formed by molding a foam bun that will serve as the seat cushion, and then attaching a pre-stitched fabric cover to the foam bun. Often, when the fabric cover is to be held securely to the foam bun along a bun contour, discrete fastenings, such as hog rings, are employed to connect a fabric flange, extending from the inner surface of the cover, to a wire retainer embedded at the bottom of a corresponding trench in the foam bun surface. Tension in the cover flange holds the cover against the bun in the contour. Other fastening methods involve fastening a clip, secured in the trench, to a bead along the flange edge.

Some fastening methods can be very labor-intensive, and can require significant manual dexterity. Some also require pneumatic tools for repetitive installations, due to the force required.

Improvements in the methods of attaching covers to contoured foam products are sought, either for contoured foam seat cushions or other applications.

SUMMARY

This specification describes technologies related to systems, apparatus, and methods for securing seat trim covers to foam cushions.

In several aspects, the products and methods of the invention feature a plurality of clips spaced-apart at intervals along a distal edge of a web, such as for securing a seat trim cover to a retainer held in a foam seat cushion, with each of the clips having a base permanently molded to, or otherwise secured to, the web, and one or more latch elements extending from the base to a point beyond the distal edge of the web.

One aspect of the invention features a method of securing a seat trim cover to a foam cushion, the method including placing a flexible seat trim cover adjacent a foam bun having a foam body outlined by a contoured outer surface, the foam bun carrying an elongated cushion retainer, and forcing each of a plurality of clips spaced-apart at predetermined intervals along a distal edge of a web of the seat trim cover into engagement with the cushion retainer, thereby simultaneously fastening and aligning the seat trim cover to the foam bun. Each of the plurality of clips includes a clip base secured to the distal edge of the web and defining a tool retention feature, and an opposing pair of latch elements extending from the clip base beyond the distal edge of the web and defining therebetween a space for receiving the retainer. Forcing each of the plurality of clips into engagement with the retainer includes engaging the tool retention feature of the clip with a tool, and applying force to the engaged tool to force the clip into engagement with the retainer.

In some examples, the latch elements of the opposing pair are offset along the distal edge of the web. In such examples, and in some others, applying force to the engaged tool includes applying a torque to twist the clip with respect to the retainer.

In some embodiments, the tool retention feature includes, or is in the form of, a tool retention aperture defined by the clip. The tool retention aperture may be in the form of an elongated slot, for example, such as for accepting a flat screwdriver blade.

In some cases the elongated slot is open along at least one side, such that a tool may be engaged by moving the tool laterally into the slot, in a direction perpendicular to a direction in which the clip is forced onto the retainer.

The aperture, such as an elongated slot, in some cases is defined in a laterally projecting boss of the clip base. In some applications, the tool retention aperture extends from an opening in a surface of the clip inboard of the distal edge of the web, such that the opening is disposed within a projected area of the web.

In some cases tool retention aperture extends through the clip between two openings, such as to enable a tool to be inserted through the aperture to bear on other structure, such as a back surface of one of the latch elements.

In some embodiments the tool retention feature includes, or is in the form of, a tool retention projection sized to be received in a corresponding aperture of the tool. The corresponding aperture of the tool may feature or be in the form of a slot open on a lateral side of the tool, such that engaging the tool retention feature comprises sliding the tool onto the clip in a direction along the web.

The cushion retainer may be embedded in the foam bun beneath a floor of an elongated trench defined in the foam body, such that forcing the clips into engagement with the retainer includes pushing the latch elements beyond the floor of the trench.

In many applications, applying force to the engaged tool includes applying a torque to twist the clip with respect to the retainer, such as to twist the clip with respect to a plane of the web.

In some examples the web also includes a listing bead reinforcing the distal edge of the web, the listing bead having or being in the form of solidified resin material over-molded along the distal edge of the web between spaced apart clips.

Each clip may include, or be in the form of, resin overmolded onto the web edge.

Another aspect of the invention features a seat cushion cover with a flexible web and a plurality of clips spaced-apart at predetermined intervals along a lower edge of the web. Each of the clips has a clip base secured to the lower edge of the web, and an opposing pair of elastically deformable latch elements extending from the clip base beyond the lower edge of the web to snap about an elongated cushion retainer below the web. Each clip has an upwardly facing surface defining a tool retention aperture sized to receive a tool and positioned so as to enable transfer of an engaging force across the distal edge to push the latch elements over a cushion retainer.

Various examples of the seat cushion cover feature technical details of the clips discussed above with respect to the inventive method.

The tool retention aperture may be in the form of an elongated slot, such as a slot that extends from an opening in the upwardly facing surface, the opening having a width to length ratio of between 2 and 5.

The upwardly facing surface is, in some examples, disposed above the lower edge of the web.

In some embodiments the tool retention aperture extends through the clip between two openings. The tool retention aperture may be disposed above and aligned with an upper surface of one of the latch elements, for engagement of the upper latch element surface by a tool inserted through the aperture.

In some embodiments the web also has a listing bead reinforcing the distal edge of the web, the listing bead having, or being in the form of, solidified resin material over-molded along the distal edge of the web between spaced apart clips.

In some cases the tool retention aperture is stepped in at length one of length and width.

In some examples the tool retention aperture is defined in one of the latch elements.

The optional features noted above with respect to other seat trim covers of the invention are also applicable to various examples of this seat trim cover.

Various implementations of the invention can provide a means for quickly and effectively securing a cover to a foam cushion, by force applied with a simple tool that engages a corresponding feature of each clip. The features can be designed to enable quick, and even blind, engagement with the tool. The clips can be formed inexpensively along an edge of a web of the cover, such as by over-molding processes, and can be configured in an advantageous offset arrangement to ease installation, such as with a torque applied to the clip by the tool, while promoting retention of a cushion retainer once engaged.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
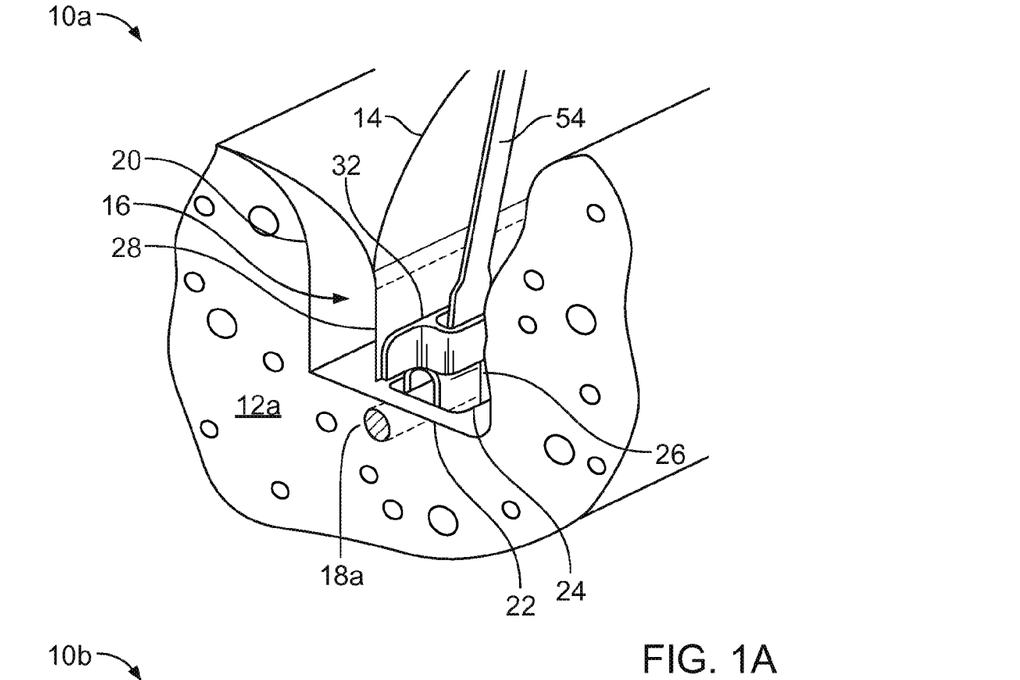
FIG. 1A is a partial cutaway view of a portion of a covered foam seat cushion having an embedded retainer, during clip installation.

Referring first to FIG. 1A, a covered foam cushion 10a includes a foam bun 12a and a cover 14 extending over a contoured outer surface of the foam bun. The bun surface features an elongated trench 16 at which the cover 14 is held in place by a retainer 18a. In this example, retainer 18a is a metal wire embedded in the body of foam bun 12a beneath trench 16. Trench 16 is defined by two opposing side walls 20 and a floor 22 spanning the distance between the side walls. In this example, the opposing trench side walls are parallel with each other and perpendicular to the trench floor. However, other trench geometries are also envisioned and compatible with the concepts discussed herein. The trench is positioned with respect to the bun contour such that holding the cover tight against the bun at the trench helps to hold the cover tight against the rest of the contour of the foam bun. In this example, the foam cushion is designed for an automotive seat. However, the concepts described in the present disclosure are not so limited, and are suitable for various other applications.

Retainer 18a is exposed to the open area of trench 16 along a series of spaced-apart openings 24 along the trench floor 22. A series of discrete clips 26 cooperate with retainer 18a to secure cover 14 to foam bun 12a. Clips 26 are secured to a flexible web (or "flange") 28 of cover 14 extending down into trench 16. Clips 26 extend beyond a distal edge of the flange and are aligned with openings 24, through which the clips extend to clip onto retainer 18a. As described below, the clips feature an opposing set of latch elements located on either side of the retainer and connected by a clip body 32 secured to the flange.

As noted above and shown in the figures, the clips described herein are provided as a series of discrete clips spaced-apart along the length of the cover flange. In many examples, each clip in the series is substantially identical in size and shape to the other clips in the series. However, it is appreciated that some applications may feature different types of clips. The spacing of the clips helps to maintain the flexibility of the flange, such as for following a curved trench in the foam bun. The clips are of an appropriate size and shape to be easily manipulated by a human installer using a simple tool. For example, the clips may be spaced along the flange with a spacing of about 50 to 200 mm between neighboring clips, with each clip having an overall length of about 10 to 30 mm in the same direction. The ratio of clip spacing to clip length is determined so as to provide a reasonably continuous connection between the cover and the foam bun, resulting in a smooth seam line, while maintaining flexibility in the flange. In some examples, the ratio of clip spacing to clip length is between 2:1 and 8:1. The number of clips and the length interval gap between clips can vary between different applications. As a practical consideration, when the retainer is embedded in the foam bun below the trench, the placement of the clips should match the spacing of the openings that expose the retainer. In some cases the clips are sufficiently stiff to be pushed into the foam to clip about the retainer, in the absence of any opening.

Figure 1B:
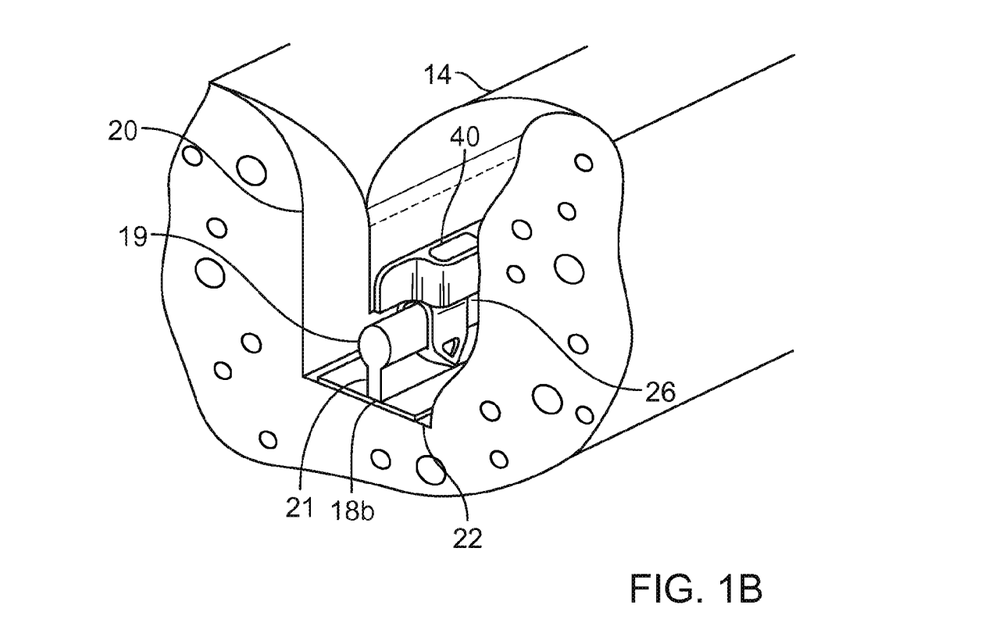
FIG. 1B is a partial cutaway view of a portion of a covered foam seat cushion having a molded bead retainer, following clip installation.

FIG. 1B shows a covered foam cushion 10b similar to the foam cushion 10a, including a foam bun 12b and a cover 14. In this example, the cover 14 is held in place by a retainer 18b permanently secured to foam bun 12b along the floor 22 of trench 16 and extending upward from the trench floor. Retainer 18b features a bulbous head 19 extending along the trench, supported on a narrow stem 21 and disposed between the trench side walls. The latch elements of clips 26 are secured about the head of the retainer.

While retainer 18b may be secured within trench 16 by any number of suitable methods, one method understood in the art is to secure the retainer to the foam as the foam is formed, such as by insert-molding the retainer in place. Such methods are described, for example, U.S. Pat. No. 7,971, 325. The secured retainer may be, for example, partially embedded in foam of the seat bun, and may include projections (not shown) extending below the surface of the foam. To aid in holding the retainer in place during foaming, the retainer may include a magnetically attractable element, such as a magnetically attractable wire (not shown) extending along its length, or a magnetic attractant additive molded into the retainer, to hold the retainer in place by a magnet embedded in a mold in which the foam bun is formed.

Referring next to FIGS. 2A-2D, a first example of a clip 26 (26a) has a clip base 32 integrally molded of resin with a pair of opposing latch elements 30 molded with the clip base and connected to the base by molded elastic hinges 31. The clip is over-molded onto the distal edge 34 of the cover flange 28. The rigid molded bases are spaced-apart from one another along the length of the flexible cover flange, leaving sections of free distal edge 34 exposed between them. The material of the cover flange between the clips allows each clip to be separately manipulated for engagement with the retainer, including by twisting the clip about an axis within the plane of the flange and perpendicular with edge 34.

Figure 2A:
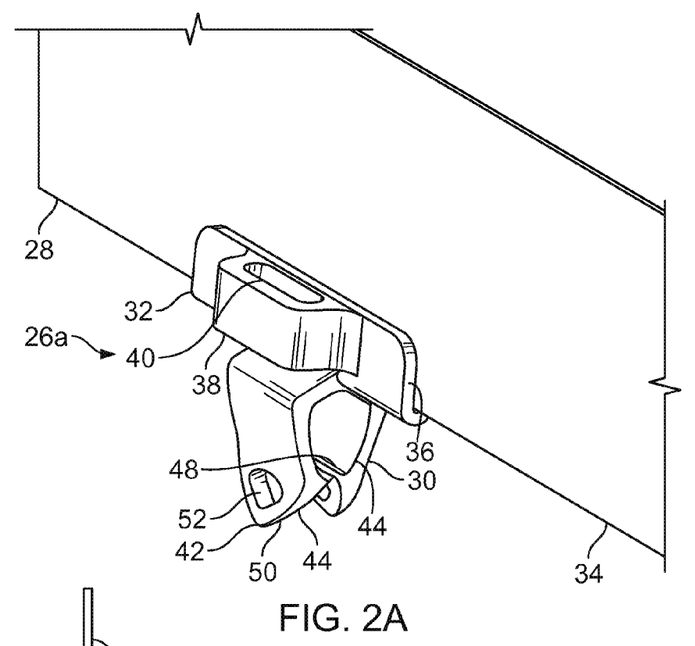
FIG. 2A is perspective view of an edge of a flexible web of a seat trim cover, showing a first clip configuration.
Figure 2B:
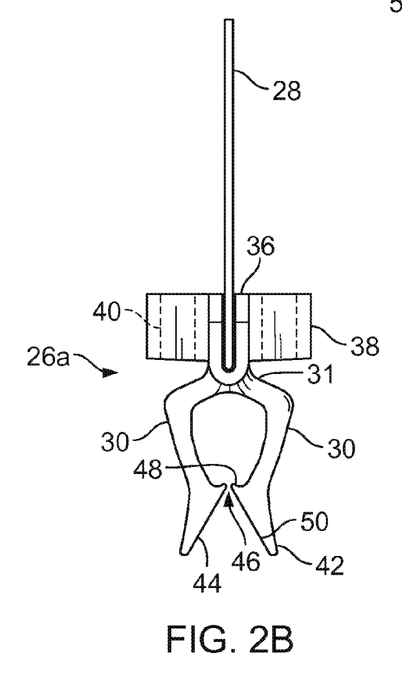
FIG. 2B is an end view of the flexible web edge of FIG. 2A.
Figure 2C:
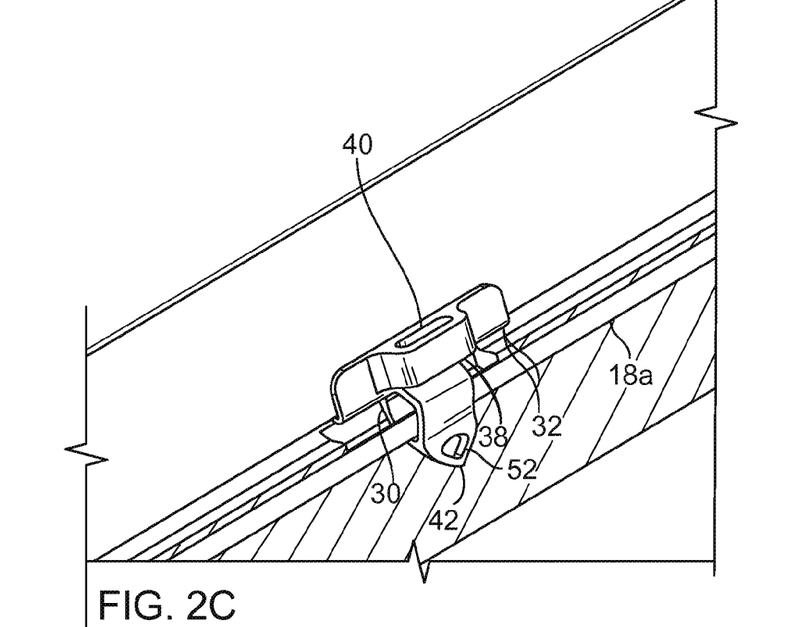
FIG. 2C shows the flexible web of FIG. 2A coupled to a retainer.
Figure 2D:
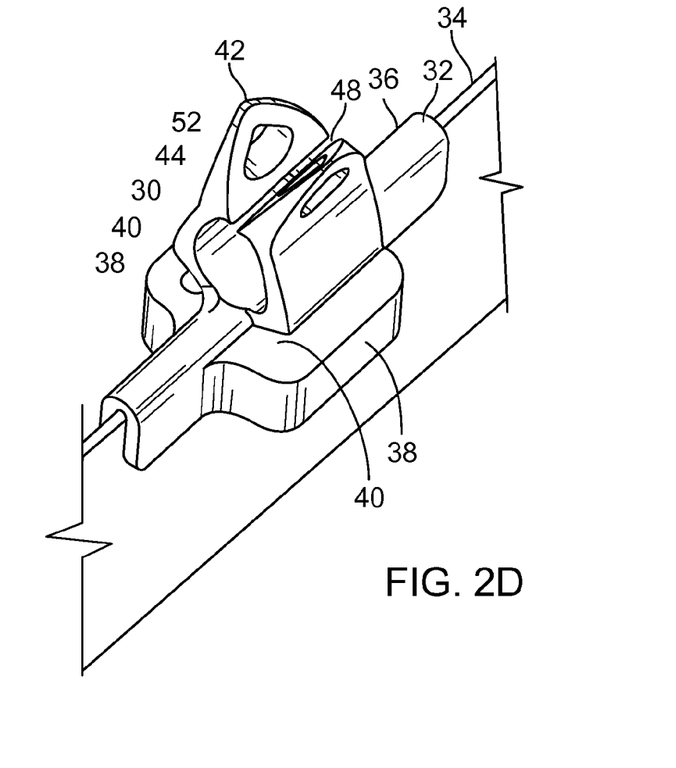
FIG. 2D is a bottom perspective view of the web of FIG. 2A.

In this example, the clip base 32 forms a base layer 36 extending along opposite sides of the cover flange, about edge 34. Molded bosses 38 on either side of the clip base extend outwardly from the base layer to define tool capture apertures 40 in the form of elongated slots extending completely through their respective bosses, as seen in FIG. 2D. The clip also includes opposed latch elements 30, each extending from a central portion of the base layer beyond edge 34 to distal tips 42. The latch elements are shaped to have opposed cam surfaces 44 defining between them a narrow throat 46 between opposing shoulders 48. The cam surfaces beyond the throat are slanted away from each other to define an entrance ramp 50 that engages the retainer for elastically forcing the latch elements away from each other to 'snap' the clip onto the retainer, such as shown in FIG. 2C. Preferably, the elasticity and contour of the latch elements is sized with respect to a given retainer such that snapping the clip onto the retainer produces both a tactile and an audible feedback to confirm engagement. The profile of the cam surfaces above shoulders 48 is chosen to securely clamp the retainer in use. Each tip 42 is generally pointed in each of two orthogonal perspectives, to aid in piercing foam for those applications in which the retainer is not exposed by openings in the seat cushion. Each latch element 30 defines a hole 52 through the latch element beyond shoulder 48, to effectively reduce friction load against the retainer during engagement. A similar effect may be obtained by similarly sized depressions in the cam surfaces.

Tool capture apertures 40 are shown as elongated slots extending between openings at top and bottom of the bosses. The openings may have flat parallel sides connected by semicircular ends, and may have an overall length of between 3 mm and 20 mm (for example, 8 mm) and a width of between 0.5 mm and 10 mm (for example, 2 mm). The slots may extend a distance between the openings of at least 1 to 8 mm. Preferably the overall length of the slot is at least 2 to 5 times the width of the slot. This configuration of tool capture aperture is selected to be compatible with a typical flat-bladed screwdriver of moderate size, such that the tapered sides of the inserted screwdriver bear against opposed flat surfaces on either side of the slot within the boss, and allow the entire clip to be manipulated by movement of the engaged screwdriver blade, either for translation or for twisting about the screwdriver shaft, as will be discussed below. With the slots extending all the way through the bosses just above the upper surfaces of the latch elements, the slots may be sized to allow the tip of a screwdriver to bear against the outer surface of the latch element, such as for pushing the clip down over the retainer. FIG. 1A shows a screwdriver 54 as a representative tool, engaged in the clip for clip manipulation during installation.

The clips described herein may be formed of a durable thermoplastic resin, and may be formed by molding them directly onto the fabric flange. As one example, an injection molding process can be used to mold the clips to the flange. The injection molding process and apparatus may resemble those used to manufacture plastic zipper tape. In this case, the distal edge of the flange is inserted into a mold cavity defining, together with any necessary slides, the negative shape of a clip, the mold cavity is sealed, and molten thermoplastic resin is injected through an injection pipe into the sealed mold cavity. The flange is released from the mold cavity once the resin has at least partially solidified and is able to hold the molded shape of the latch elements. The resin may be relatively stiff so as to securely clasp the retainer to hold the seat trim cover in place. Examples of resins from which the latch elements can be formed include polypropylene (PP), polyamide (PA), polybutylene terephthalate (PBT), polycarbonate/acrylonitrile butadiene styrene (PC/ABS), polyoxymethylene (POM) or filled versions of these thermoplastics (e.g., talc-filled, glass-filled, etc.).

Figure 3A:
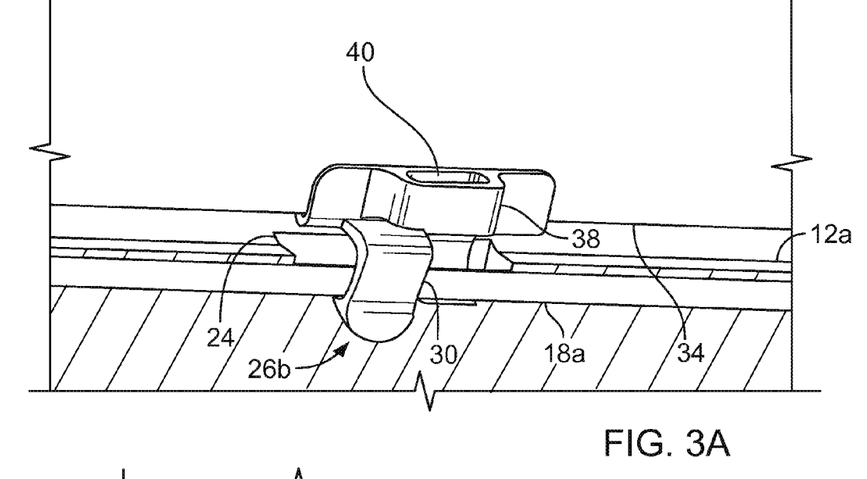
FIGS. 3A through 3D illustrate a second clip configuration.
Figure 3B:
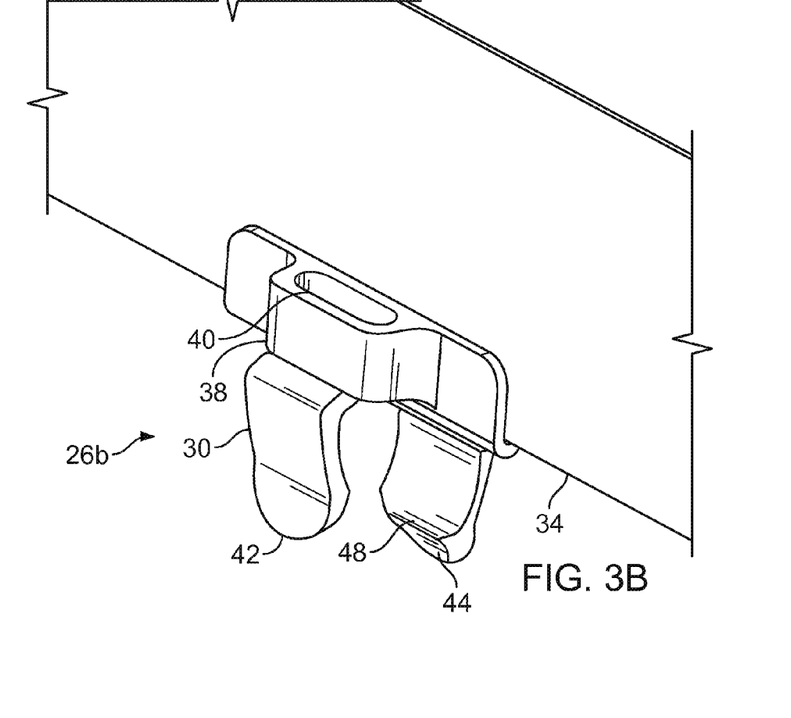
Figures 3C, 3D:
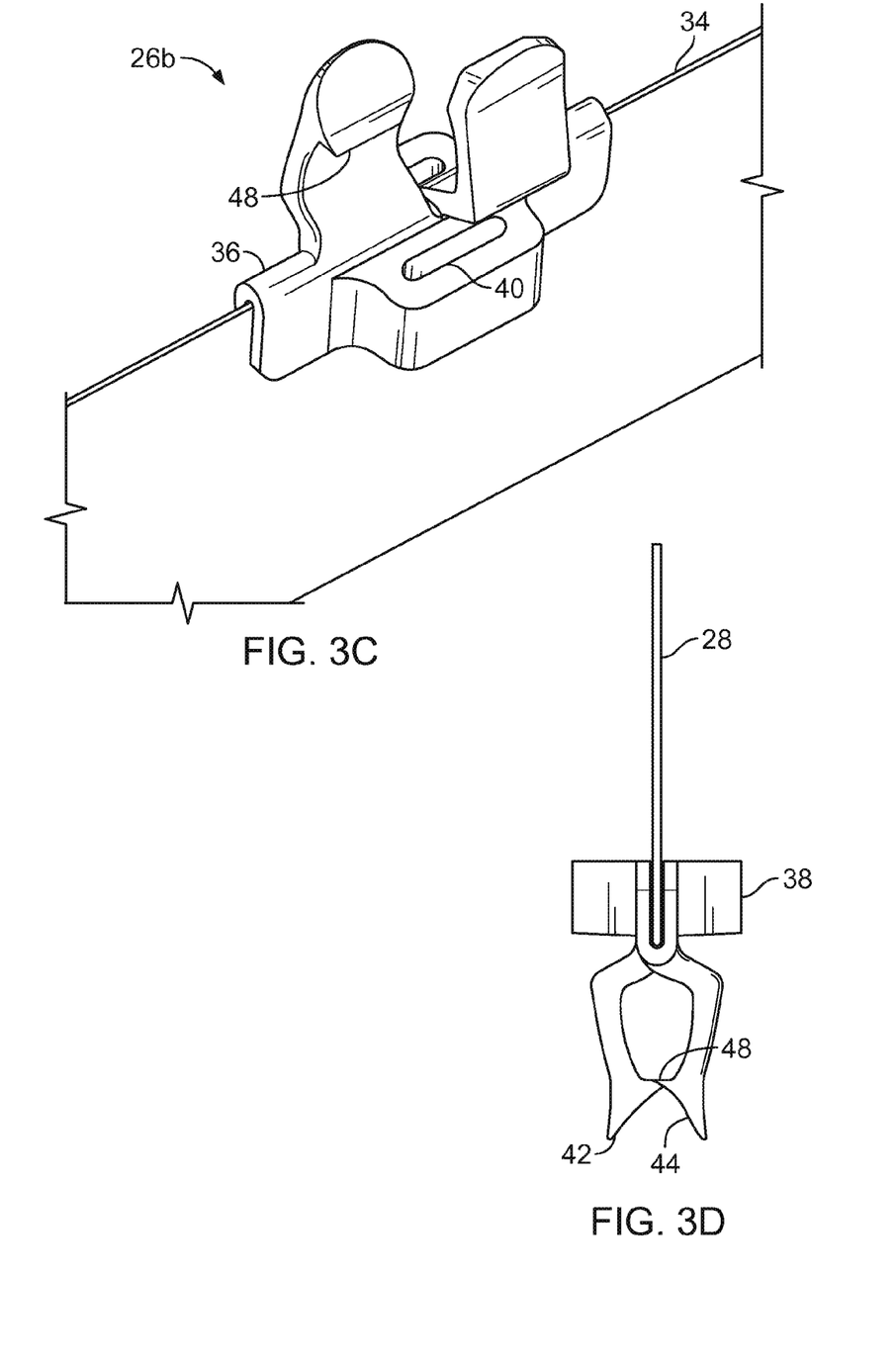

Referring next to FIGS. 3A-3D, a second example of a clip 26 (26b) has a clip base 32 integrally molded of resin with a pair of opposing latch elements 30 offset from one another along the length of the flange. As seen in the end view of FIG. 3D, the cam surfaces of the latch elements are shaped to have a slight lateral overlap at shoulders 48. As shown in FIGS. 3B and 3D, latch element tips 42 are generally rounded in side view and pointed in end view, and the latch elements are solid in the region beyond shoulder 48. Clip 26b is otherwise identical to clip 26a discussed above.

Figure 3E:
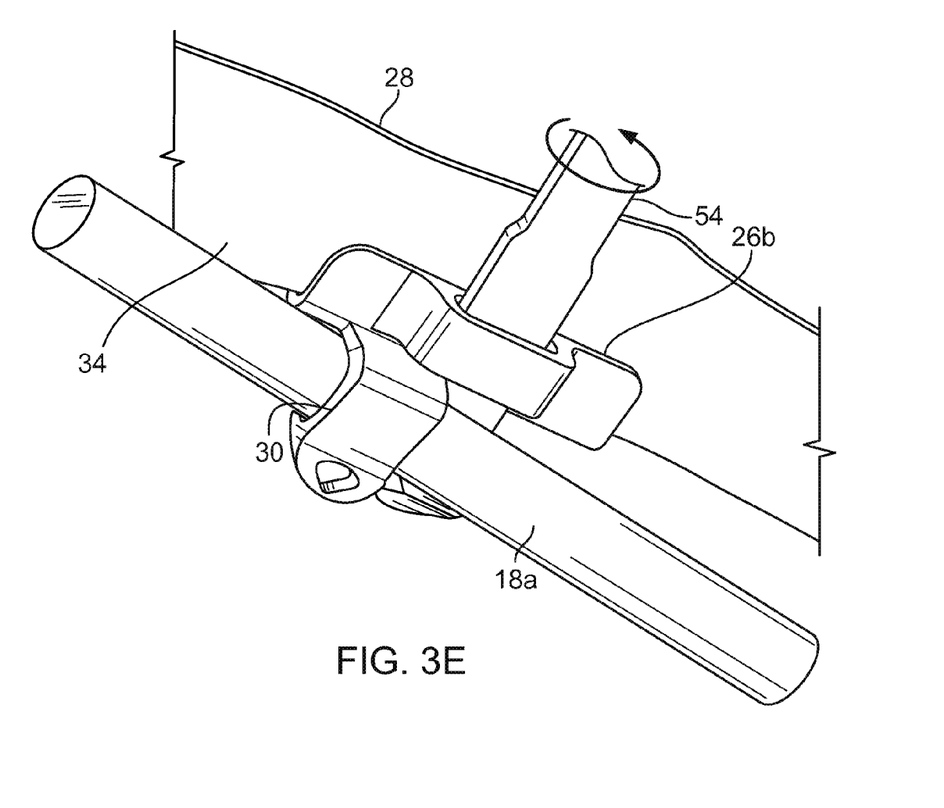
FIG. 3E shows the clip of FIG. 3A being twisted to engage a cushion retainer.

The offset of the latch elements of clip 26b enables the installation force to be lessened by twisting the clip as it is snapped over the retainer. For example, FIG. 3E shows torque being applied to an inserted tool 54 to twist the clip to reduce the amount of elastic latch element deformation required to snap the clip over retainer 18b. Once the clip is in place, the torque is relaxed and the clip and flange return to the orientation as shown in FIG. 3A. The twisting of each clip is aided by the flexibility of flange 28.

Figures 4, 5:
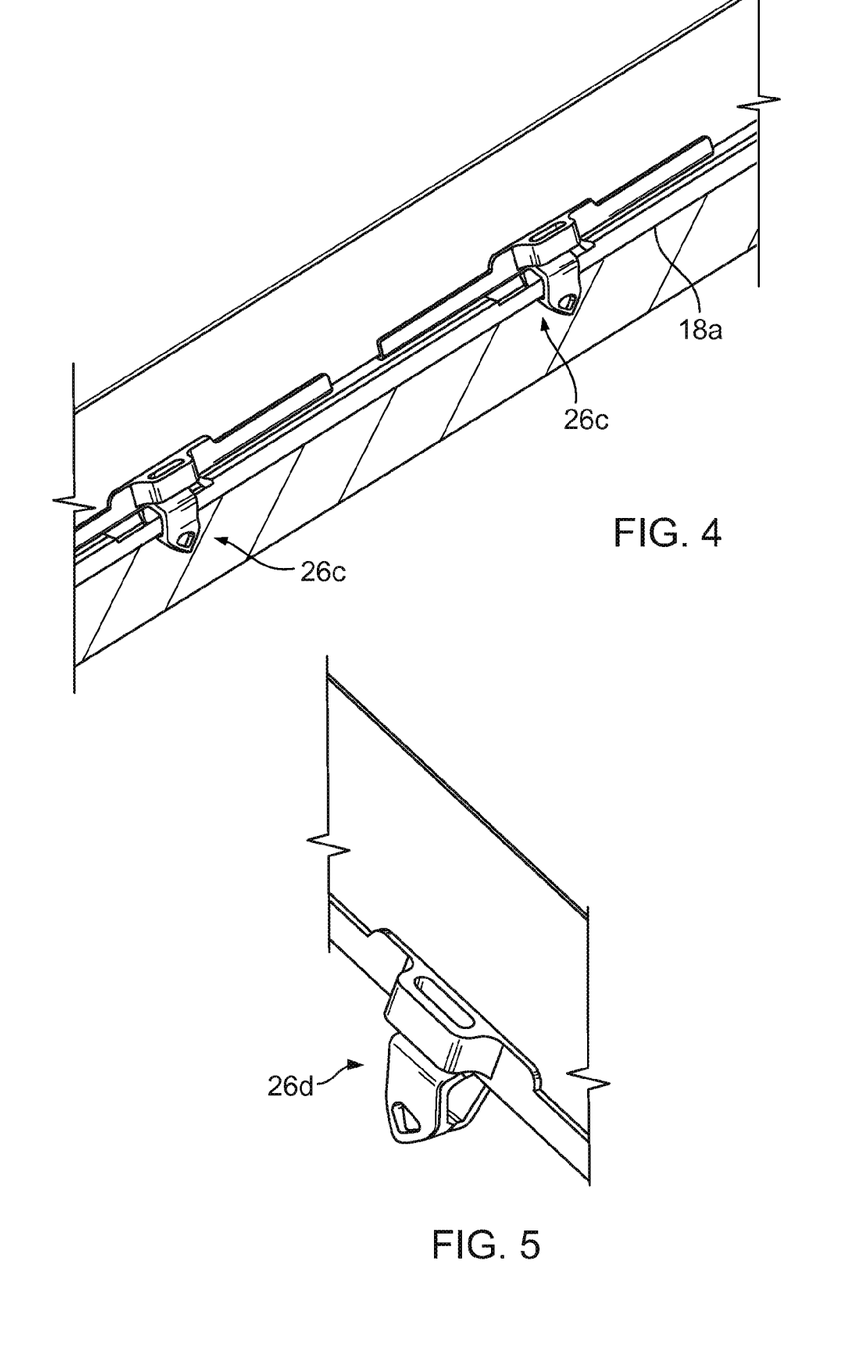
FIGS. 4 and 5 are perspective views of an edge of a flexible web of a seat trim cover, showing third and fourth clip examples, respectively.

The bases of the clips may be modified to cover different proportions of the free edge of the flange. Longer clip bases can provide extra rigidity to the flange edge, which may be desirable along straight seams, for example. FIG. 4 shows clips 26c that are identical to clips 26a described above, except that the clip bases extend much farther along the length of the flange. Similarly, clip 26d in FIG. 5 is an integral part of a clip base that extends along the entire length of the flange and is provided with a number of spaced clips 26d and forms a listing bead along the flange edge. The short spaces between adjacent clip bases in the configuration of FIG. 4 function as discrete hinge points to allow individual clips to be twisted out of the plane of the web, effectively functioning as hinges along the web. Similarly, the continuous base of FIG. 5 can be provided with discrete regions of relatively thinner resin.

Figures 6, 7A:
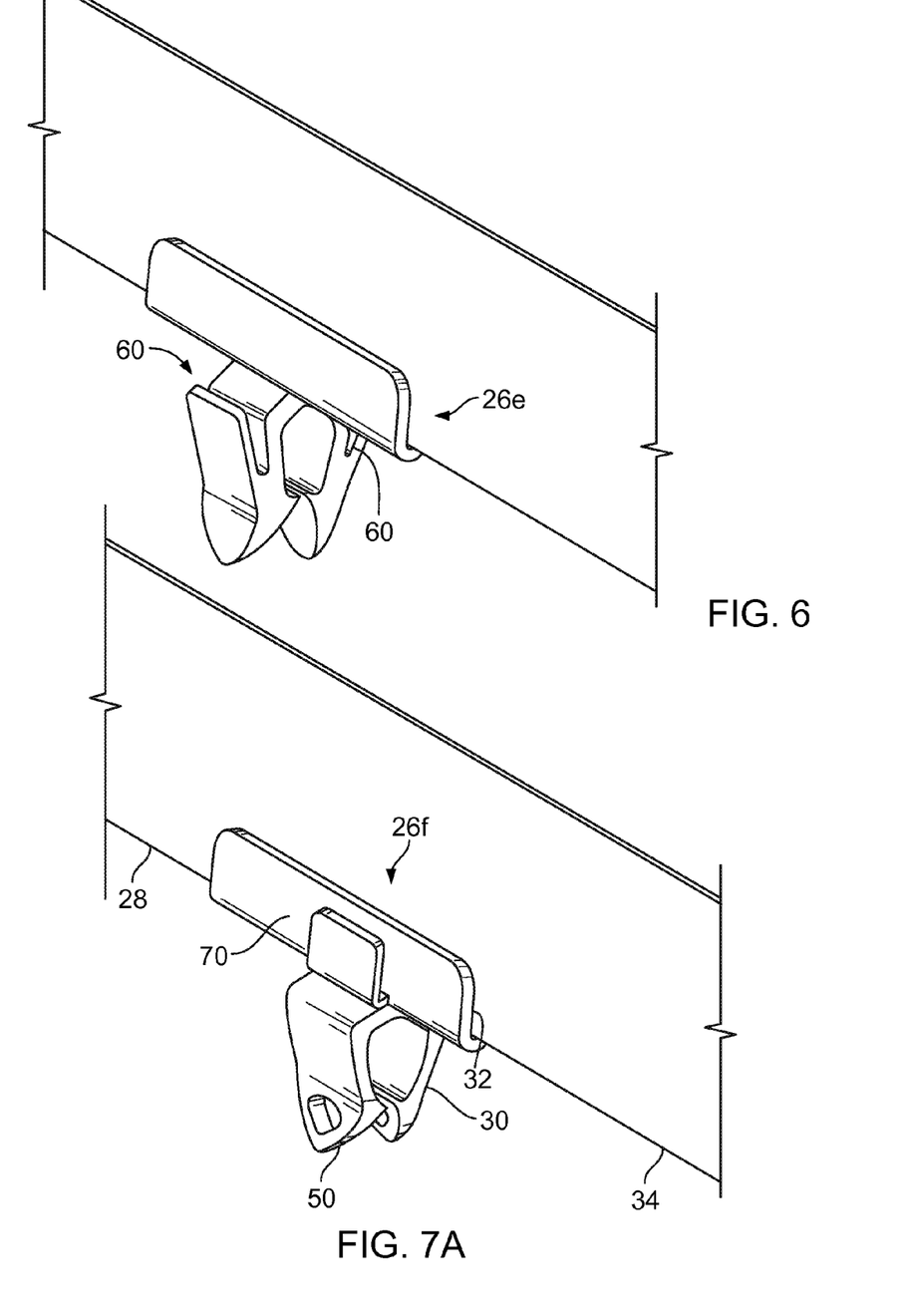
FIG. 6 is a perspective view of a fifth clip example.
FIGS. 7A and 7B are perspective and end views, respectively, of a sixth clip example.

The clips of FIGS. 2A-5 feature tool capture apertures in the form of slots that are surrounded by material of the clips and extend completely through the bosses. However, other shapes of tool capture apertures are envisioned. For example, the clips may be molded such that the slots are 'blind' in that they do not extend all the way through the bosses but extend from openings in the upper surfaces of the bosses to aperture floors against which a tool may press to push the clip into engagement. For applications where twisting of the clips is planned, such blind slots should extend into the clips a significant distance, such as at least twice the width of the slot, so as to retain the tool during twisting. The tool capture aperture may be tapered in width and/or length more than necessary for molding, such as to mate with a tapered tool blade. The width and/or length of the aperture may be stepped, such that an upper portion of the aperture is larger than a lower portion, for receiving tool blades of multiple discrete sizes. While the apertures have been illustrated as rectangular slots, other shapes are envisioned, such as x-shaped slots for receiving a Phillips-style bit, or a round, hexagonal hole or star-shaped hole for use with an axisymmetric tool of a mating shape. Unique aperture shapes can be provided, to mate with tools specifically designed for this purpose. In other cases the clips have tool capture features that are not enclosed apertures but are gaps or spaces defined between clip surfaces and sized to receive, and be manipulated by, a given tool. For example, FIG. 6 shows a clip 26e in which the tool capture feature is in the form of an open slot 60 defined in an outside or back portion of each clip latch element and open upward so as to receive a tool, such as a narrow blade of a screwdriver, inserted from above the clip. By force exerted via the screwdriver blade, the overall clip can be forced downward over the retainer. In addition, to release the clip individual latch element engaged by the screwdriver blade can be manipulated outward to open the clip. Similar slots may be provided on both sides of the clip. In this example, the base is a relatively thin layer of molded plastic and does not feature an outwardly extending boss, thereby providing access to slots 60.

Figure 7B:
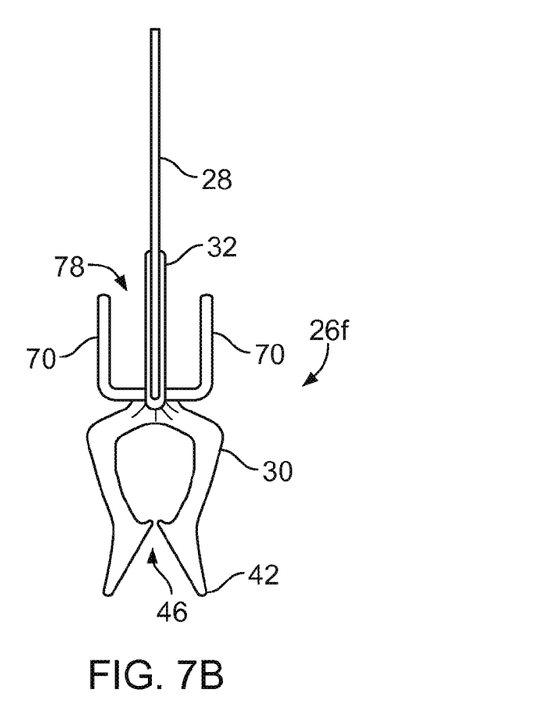
Figure 7C:
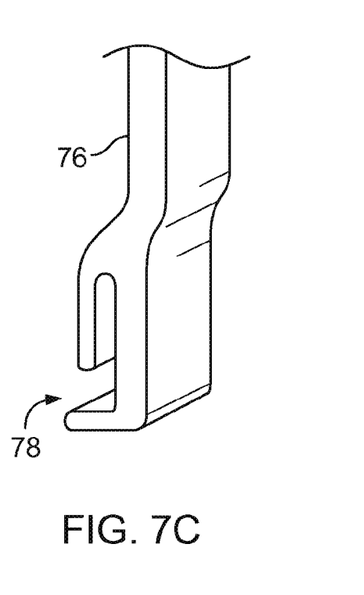
FIGS. 7C and 7D illustrate two examples of tools for engaging the clip of FIGS. 7A and 7B.
Figure 7D:
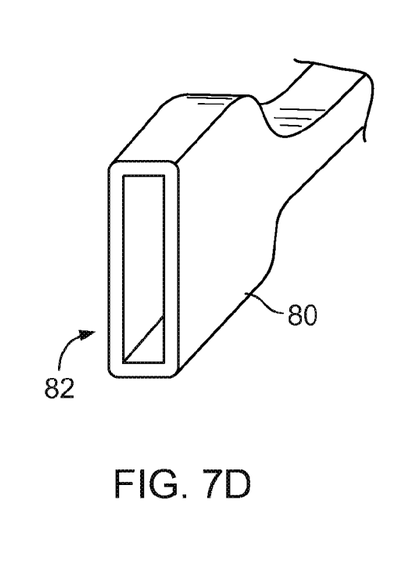

In the clip 26f of FIGS. 7A and 7B, each side of the base is provided with an angled projection 70. The projection extends upward to define, together with an opposing surface of the base, a slot that is open upward and on both ends. FIGS. 7C and 7D show two examples of tools that can be used to engage and manipulate clip 26f of FIGS. 7A and 7B. The tool 76 of FIG. 7C defines a slot 78 running the width of the tool (or open on at least one side of the tool) and of a complementary shape to projection 70, such that the tool can be slid over the projection in a direction running the length of the clip. Once engaged, tool 76 can be manipulated to lift or lower clip 26f as needed, as well as twisted to apply torque to the clip. The tool 80 of FIG. 7D defines a blind slot 82 extending upward into the tool and sized to receive the vertical portion of projection 70 of the clip 26f of FIGS. 7A and 7B. Engaged, tool 80 can be manipulated to push clip 26f into engagement on a retainer, and can be twisted to apply torque to the clip, but is not able to apply an upward force to the clip. In both examples, the tool capture feature is in the form of a projection extending upwardly from the clip and sized to be received in an aperture of a tool. In such a case, the projection preferably has a cross-section profile through which torque can be imparted to the clip by the tool.

The illustrated examples feature clips with latch elements that are substantially identical or very similar to one another. However, in some other examples (not shown), the latch elements have different cam surface profiles. One profiled latch element may even be pared with a straight (non-profiled) latch element, so long as together the latch elements are designed to retain the clip to the retainer.

A number of embodiments of the invention have been described. Nevertheless, it will be understood that various modifications may be made without departing from the spirit and scope of the inventions.

What is claimed is:

1. A method of securing a seat trim cover to a foam cushion, the method comprising:
   placing a flexible seat trim cover adjacent a foam bun having a foam body outlined by a contoured outer surface, the foam bun carrying an elongated cushion retainer; and
   forcing each of a plurality of clips spaced-apart at predetermined intervals along a distal edge of a web of the seat trim cover into engagement with the cushion retainer, thereby simultaneously fastening and aligning the seat trim cover to the foam bun,
   wherein each of the plurality of clips comprises
      a clip base secured to the distal edge of the web and defining a tool retention feature, and
      an opposing pair of latch elements extending from the clip base beyond the distal edge of the web and defining therebetween a space for receiving the retainer, each of the pair of latch elements comprising a cam surface continuously extending away from the opposing latch element of the pair, the cam surfaces defining an entrance ramp terminating at respective distal tips of the latch elements, each of the distal tips being tapered in two orthogonal directions; and
   wherein forcing each of the plurality of clips into engagement with the retainer comprises engaging the tool retention feature of the clip with a tool; and
      applying force to the engaged tool to force the retainer against the cam surfaces, thereby elastically urging the latch elements away from each other as the retainer rides along the entrance ramp.

2. The method of claim 1, wherein the latch elements of the opposing pair are offset along the distal edge of the web.

3. The method of claim 1, wherein the tool retention feature comprises a tool retention aperture defined by the clip.

4. The method of claim 3, wherein the tool retention aperture is in the form of an elongated slot.

5. The method of claim 4, wherein the elongated slot is open along at least one side.

6. The method of claim 4, wherein the elongated slot is defined in a laterally projecting boss of the clip base.

7. The method of claim 3, wherein the elongated slot extends from a surface of the clip inboard of the distal edge of the web.

8. The method of claim 3, wherein the tool retention aperture extends through the clip between two openings.

9. The method of claim 1, wherein the tool retention feature comprises a tool retention projection sized to be received in a corresponding aperture of the tool.

10. The method of claim 9, wherein the corresponding aperture of the tool comprises a slot open on a lateral side of the tool, such that engaging the tool retention feature comprises sliding the tool onto the clip in a direction along the web.

11. The method of claim 1, wherein the cushion retainer is embedded in the foam bun beneath a floor of an elongated trench defined in the foam body, such that forcing the clips into engagement with the retainer comprises pushing the latch elements beyond the floor of the trench.

12. The method of claim 1, wherein applying force to the engaged tool includes applying a torque to twist the clip with respect to the retainer in a direction perpendicular to the distal edge of the web and about an axis within a plane of the web.

13. The method of claim 1, wherein the web further comprises a listing bead reinforcing the distal edge of the web, the listing bead comprising solidified resin material over-molded along the distal edge of the web between spaced apart clips.

14. The method of claim 1, wherein each clip comprises resin overmolded onto the web edge.

15. A seat cushion cover comprising:
a flexible web; and
a plurality of clips spaced-apart at predetermined intervals along a lower edge of the web, each of the clips comprising:
a clip base secured to the lower edge of the web, and
an opposing pair of elastically deformable latch elements extending from the clip base beyond the lower edge of the web to snap about an elongated cushion retainer below the web, each of the pair of latch elements comprising a cam surface continuously extending away from the opposing latch element of the pair, the cam surfaces defining an entrance ramp terminating at respective distal tips of the latch elements, each of the distal tips being tapered in two orthogonal directions;
wherein each clip has an upwardly facing surface defining a tool retention aperture sized to receive a tool and positioned so as to enable transfer of an engaging force across the distal edge to push the latch elements over a cushion retainer.

16. The seat cushion cover of claim 15, wherein the latch elements of the opposing pair are offset along the distal edge of the web.

17. The seat cushion cover of claim 15, wherein the tool retention aperture is in the form of an elongated slot.

18. The seat cushion cover of claim 17, wherein the slot extends from the upwardly facing surface, the slot, at an intersection with the upwardly facing surface, having a width and a length defining a length to width ratio of between 2 and 5.

19. The seat cushion cover of claim 15, wherein the upwardly facing surface is disposed above the lower edge of the web.

20. The seat cushion cover of claim 15, wherein the tool retention aperture extends through the clip between two openings.

21. The seat cushion cover of claim 20, wherein the tool retention aperture is disposed above and aligned with an upper surface of one of the latch elements, for engagement of the upper latch element surface by a tool inserted through the aperture.

22. The seat cushion cover of claim 15, wherein the web further comprises a listing bead reinforcing the distal edge of the web, the listing bead comprising solidified resin material over-molded along the distal edge of the web between spaced apart clips.

23. The seat cushion cover of claim 15, wherein each clip comprises resin overmolded onto the web edge.

24. The seat cushion cover of claim 15, wherein the tool retention aperture is stepped in at least one of length or width.

25. The seat cushion cover of claim 15, wherein the tool retention aperture is defined in one of the latch elements.

26. The method of claim 1, wherein forcing each of the plurality of clips into engagement with the retainer further comprises piercing the foam bun with the distal tips.

27. The method of claim 1, wherein each of the tips is rounded in side view and pointed in end view.

28. The method of claim 1, wherein each of the tips is pointed in both side view and in view.

29. The seat cushion cover of claim 15, wherein each of the tips is sufficiently tapered to pierce through a foam bun carrying the cushion retainer when forced against the foam bun by a user.

30. The seat cushion cover of claim 15, wherein each of the tips is rounded in side view and pointed in end view.

31. The seat cushion cover of claim 15, wherein each of the tips is pointed in both side view and in view.

* * * * *